United States Patent Office 3,098,789
Patented July 23, 1963

3,098,789
AGRICULTURAL SPRAY EMULSION CONCENTRATES AND THEIR METHOD OF MANUFACTURE
Francis W. Littler, Mineola, N.Y., assignor to Socony Mobil Oil Company, Inc., a corporation of New York
No Drawing. Filed Mar. 29, 1960, Ser. No. 18,229
3 Claims. (Cl. 167—42)

This invention is directed to insecticidal compositions predominantly composed of DDT and minor amounts of selected additional ingredients, which compositions are in concentrated form and can readily be mixed with water to form stable emulsions of the type suitable for agricultural purposes.

Many insecticides have been developed in recent years and are sprayed or dusted onto various crops. The outstanding insecticide of this group is DDT (2,2-bis(p-chlorophenyl)-1,1,1-trichloroethane). This insecticide is too toxic and too expensive to be utilized in other than diluted form. The DDT has therefore been provided as: (1) Solutions in organic solvents, ready for use. (2) Concentrated solutions in organic solvents, with emulsifying agents added, for preparing water emulsions. (3) Mixtures with dry powders, containing wetting agents, to be used in water suspensions. (4) Mixtures with dry powders, contaning wetting agents, to be used as dusts. (5) Mixtures (or solutions) with propellent gases under pressure, to be applied as aerosols. (6) Mixtures (or solutions) in paints, polishes, and other surface coatings. (7) Mixtures (or solutions) for impregnating fabrics, paper, etc. Solutions of DDT are usually made with an odorless, colorless kerosene solvent. The usual concentration in these ready-to-use sprays is 5%, and they are commonly applied as residual sprays—that is, to surfaces with which insects come in contact. The solvent evaporates rapidly, leaving a light deposit of DDT on the surface which kills the insect by contact action.

Emulsion concentrates of DDT are prepared by using a solvent such as xylene and methylated naphthalenes to produce a 25% concentration of DDT. A suitable emulsifier is incorporated in the solution, so that dilution with water will produce a stable emulsion. The aromatic solvents, such as benzene, toluene, xylene and naphthalene, are expensive. The prior art has recognized that dilute solutions of DDT in these solvents could be prepared but these have been limited to about 25–35% DDT, it being considered impossible to prepare a DDT solution possessing more than about 35% DDT. This necessitated, therefore, the use of a large amount of expensive solvent. The large volume of aromatic solvent in these DDT formulations, even when diluted with water to form a 5% DDT emulsion for spray purposes, has been found harmful to plants. The aromatics are absorbed into the pores of the plants and they are highly toxic to the plant.

Efforts have been made to develop a concentrate containing more than 35% DDT and preferably up to 60% DDT suitable for shipment of maximum weight of effective material at minimum shipping weight. This concentrate must be capable of forming a stable emulsion of say 5% DDT when stirred in added water. All previous efforts have failed to produce a stable emulsion, except in those instances where the DDT content in an aromatic oil solvent is maintained below about 35% by weight. Furthermore, it has always been necessary in the prior art to mix more than an equal amount of aromatic oil with the DDT to obtain satisfactory emulsions. Suitable DDT emulsions having greater than a 1 to 1 ratio of DDT to aromatic oil have been sought to reduce the toxic effect of the aromatic oil to plant life but all efforts to compound such rich DDT to oil formulations have failed.

I have found that contrary to all expectations stable water emulsions of DDT can be obtained provided a critical amount of a highly-aromatic, high-boiling hydrocarbon oil is first mixed with the DDT, a dual surfactant system and water to form a DDT concentrate. The oil must contain more than 70% aromatics and boil over a substantial range such as broadly about 300–700° F. and preferably about 330–560° F. The mixed aniline point of the oil should be less than 110° F. with the preferred range being 65–85° F. The amount of oil used should be limited to 5–25% of the emulsion concentrate and preferably 10–15% of the concentrate. The surfactant system is also critical and requires an anionic and nonionic material in correct balance. It is found that this highly concentrated DDT water emulsion can be blended with added water to readily produce a stable DDT emulsion containing 5% or less DDT. Furthermore, these emulsions or concentrates can be compounded with a ratio of 1 to 1 up to 6 to 1 parts of DDT to aromatic oil.

The object of this invention is to provide a concentrated DDT emulsifiable insecticide composition which can be blended with water to produce stable emulsions suitable for spraying.

It is a further object of this invention to provide a stable concentrated DDT water emulsion in which the DDT content is greater than the oil content.

It is a further object of this invention to provide a stable DDT water emulsion in which the oil content is less than one-third the DDT content.

These and further objects of the invention will be disclosed in the following detailed discussion of the invention.

Prior DDT emulsions have required at least as much aromatic oil as DDT and generally substantially more aromatic oil than DDT was found necessary. The shipment of this large volume of expensive oil has been highly undesirable, and, furthermore, the applications of this amount of toxic aromatic oil to plants has resulted in damage to the plants even though the total DDT content was reduced to 5% or less by dilution with water.

I have found that highly aromatic oils containing about 75–85% aromatics and boiling over a substantial range are useful in admixture with more than an equal amount of DDT to form stable water emulsions when diluted with water. The aromatic content may vary broadly over a range about 70–90%, but beyond the preferred range of 75–85% the stability of the emulsion is impaired. There are many sources for the aromatic oil of this invention, such as fractions from recycle bottoms from catalytic cracking, bottoms from catalytic reforming, aromatic-rich bottoms from the production of ethylene and propylene at high temperature, Edeleanu extracts, aromatic coal tar fractions, aromatic fractions from the hydrogenation of coal or the hydrogenation of coker gas oil. Narrow boiling fractions or single compounds, such as xylene, benzene or alpha-methyl naphthalene do not operate in accordance with this invention and are not satisfactory. The aromatic oil must be a fairly continuously boiling fraction over the range broadly about 300–700° F. and preferably 330–560° F. The mixed aniline point of this oil should be less than 110° F. with the preferred range 65–85° F.

The emulsifying system to be incorporated with the small amount of aromatic oil and the DDT is found to be highly critical. A nonionic emulsifier or surface active agent is blended in critical proportion with an anionic emulsifier or surface active agent. The acceptable nonionic emulsifier is a polyoxyethylene ether of t-octyl phenol having about 15–16 mols of ethylene oxide per mol of finished product. The acceptable anionic emulsifier or surface active agent is a sodium salt of a polyoxyethylene ether sulfonate of t-octyl phenol having about 17–18 mols of ethylene oxide per mol of finished product. The nonionic emulsifier must be blended with the anionic emulsifier within the range of 1:9 to 9:1 to give the desired maximum spontaneity and emulsion stability to the formulation in water representative of that used in spray applications. With soft waters a great amount of anionic agent is preferred whereas with hard waters the ratio is shifted to favor the nonionic agent. The amount of nonionic emulsifier used may vary from about 0.1–10% by weight of the composition and preferably may vary from about 1–5% by weight of the composition. The anionic emulsifier used may also vary broadly from about 0.1–10% by weight of the composition and preferably may vary from about 1–5% by weight of the composition. The total of the two emulsifiers, however, should not exceed about 10% by weight of the composition.

Table I shows typical physical characteristics of one oil sold commercially and satisfactory for use in this invention and one oil sold commercially which is not satisfactory for use in this invention.

TABLE I

*Properties of Oils in Insecticidal Emulsions*

|  | Certrex 47 [1] | Agronyl R [2] |
|---|---|---|
| Gravity, API | 20.1 | 19.5 |
| Flash, PM, °F | 160 | 192 |
| Flash, COC, °F | 175 | 325 |
| Vis. SUS @ 100° F | 33 | 104 |
| Color, ASTM | Dk. 1½ |  |
| Color | Straw | Dk. Green |
| Unsulfonated Residue, Percent | 19.6 | 61 |
| Pour Pt., °F | less than 0 | +85 |
| Percent Aromatics | 80.4 | 40 |
| Mixed Aniline Cloud Pt., °F | 76.3 | 152.6 |
| Distillation: |  |  |
| I.B.P., °F | 336 | 430 |
| 50%, °F | 457 | 715 |
| Final, °F | 548 | 738 |

[1] Certrex 47 is a trademark of Socony Mobil Oil Co., Inc.
[2] Agronyl R is a trademark of Socony Mobil Oil Co., Inc.

EXAMPLE I

As an illustration of the invention 40% by weight DDT was mixed with 7.5% by weight highly aromatic hydrocarbon oil boiling substantially continuously over a range of about 330–560° F. and the mixture heated to 180° F. A separate mixture of 46.5% by weight water, 4% anionic emulsifier comprising a sodium salt of polyoxyethylene ether sulfonate of t-octyl phenol having about 17–18 mols of ethylene oxide per mol of finished emulsifier, and 2% by weight of nonionic emulsifier comprising a polyoxyethylene ether of t-octyl phenol having about 15–16 mols of ethylene oxide per mol of finished emulsifier was heated to 180° F. The two phases, water and organic, were combined in an homogenizer (Manton-Gaulin) tank and stirred. The mixture was passed through the homogenizer at a 3000 lb. pressure setting. The temperature of the mixture was maintained at about 175–180° F. during the homogenization. The hot homogenized mixture was then immediately placed in a beaker immersed in a cold water bath and cooled to 110° F. while being stirred. The cold storage stability of the emulsion was checked by placing a bottle of the emulsion under refrigeration for 24 hours and was then kept at room temperature for eight hours. The emulsion was thick on removal from refrigeration but when heated to room temperature, the emulsion regained its former fluidity. The sample was then placed under refrigeration for a second 72-hour period followed by an 8-hour period at room temperature, and the emulsion was found to be unharmed and still stable. The same sample was then put in −10° F. storage for a 24-hour period. On withdrawal the emulsion was frozen solid, but after standing until it reached room temperature, it regained its former fluidity and was found stable and unharmed.

EXAMPLE II

As an additional illustration of the invention 23.75% by weight of DDT was mixed with 23.75% by weight of highly aromatic hydrocarbon oil boiling substantially continuously over a range of about 330–560° F. and the mixture heated to 180° F. A separate mixture of 47.5% by weight water, 4% by weight anionic emulsifier comprising a sodium salt of polyoxyethylene ether sulfonate of t-octyl phenol having about 17–18 mols of ethylene oxide per mol of finished emulsifier, and 1% by weight of nonionic emulsifier comprising a polyoxyethylene ether of t-octyl phenol having about 15–16 mols of ethylene oxide per mol of finished emulsifier was heated to 180° F. The separate mixtures were combined in a Manton-Gaulin homogenizer and passed through the homogenizer at a 3000 lb. pressure setting. The temperature of the mixture in the homogenizer was maintained at 175–180° F. The cooled homogenized mixture was placed in storage at room temperature for over 180 days and showed no signs of separation.

EXAMPLE III

As an additional illustration of the invention 40% by weight of technical DDT was mixed with 7.5% by weight of highly aromatic hydrocarbon oil boiling substantially continuously over a range of about 330–560° F. and the mixture heated to 180° F. A separate mixture of 46.5% by weight water, 3% by weight anionic emulsifier comprising a sodium salt of polyoxyethylene ether sulfonate of t-octyl phenol having about 17–18 mols of ethylene oxide per mol of finished emulsifier, and 3% by weight of nonionic emulsifier comprising a polyoxyethylene ether of t-octyl phenol having about 15–16 mols of ethylene oxide per mol of finished emulsifier was heated to 180° F. The separate mixtures were combined in a Manton-Gaulin homogenizer and passed through the homogenizer at a 3000 lb. pressure setting. The temperature of the mixture in the homogenizer was maintained at 175–180° F. The cooled homogenized mixture was placed in storage at room temperature for more than 30 days and showed no sign of separation.

EXAMPLE IV

As an additional illustration of the invention 40% by weight of technical DDT from a different supplier than that of Example III was mixed with the aromatic oil of Example III and this mixture was blended with the same materials in the same amounts and under the same conditions of Example III. The resulting emulsion was allowed to stand at room temperature for more than 30 days and showed no sign of separation.

EXAMPLE V

In order to demonstrate the toxic effect of emulsions prepared in accordance with the teaching of the invention with sharply reduced content of aromatic oil, a fly kill test on house flies was conducted. The test specimens were prepared by removing the outer screen from the fly cage and spraying the DDT spray onto the screen. When the screens were thoroughly dried, they were reinserted in the fly cage and flies placed in the cage were enabled to make contact with the screen. All test sprays were diluted to a 5% DDT concentration for comparative purposes. The results of these tests were as follows:

|  | Fly Kill, percent | |
|---|---|---|
|  | Visual Observation, 5 Hours | Actual Count, 24 Hours |
| 40% DDT Emulsion as defined in Example I | 50 | 99 |
| Commercial Emulsifiable DDT concentrate (25% solution in xylene) | 99 | 100 |
| 50% DDT Wettable Powder | 100 | 100 |

At the conclusion of the 24-hour test period the sprayed screens were removed and weathered on an open roof where they were subject to the elements for a one week period. At the end of this period, the test was redone to determine the effect of weathering on emulsions and the results were as follows:

|  | Fly Kill, percent | |
| --- | --- | --- |
|  | Visual Observation, 5 Hours | Actual Count, 24 Hours |
| 40% DDT Emulsion as defined in Example I | 50 | 100 |
| Commercial Emulsifiable DDT concentrate (25% solution in xylene) | 80 | 100 |
| 50% Wettable Powder | 100 | 100 |

As is seen from the results, even though the aromatic oil content has been sharply reduced in the formulation to a tolerable level for plant life, the toxic effect of the formulation on insects is still at a high level and the emulsion does not suffer from weathering even for long periods of time.

EXAMPLE VI

As an illustration of an oramtic oil which failed to provide a satisfactory emulsion 40% by weight DDT was mixed with 7.5% by weight of Agronyl R (trade name of Socony Mobil Oil Company, Inc.) the specifications for this oil being found in Table I and the mixture heated to 180° F. A separate mixture of 46.5% by weight water, 4% anionic emulsifier comprising a sodium salt of polyoxyethylene ether sulfonate of t-octyl phenol having about 17-18 mols of ethylene oxide per mol of finished emulsifier, and 2% by weight of nonionic emulsifier comprising a polyoxyethylene ether of t-octyl phenol having about 15-16 mols of ethylene oxide per mol of finished emulsifier was heated to 180° F. The two phases, water and organic, were combined in an homogenizer (Manton-Gaulin) tank and stirred. The mixture was passed through the homogenizer at a 3000 lb. pressure setting. The temperature of the mixture was maintained at about 175-180° F. during the homogenization. The hot homogenized mixture was then immediately placed in a beaker immersed in a cold water bath and cooled to 110° F. while being stirred. This sample separated completely on standing within a matter of minutes and was not satisfactory.

A suitable highly aromatic oil for use in this process is the oil known as Certrex 47, sold by Socony Mobil Oil Company, Inc.

A suitable nonionic emulsifier for use in this process is Triton X-152, manufactured and sold by Rohm & Haas Corporation.

A suitable anionic emulsifier for use in the process is the Triton X-172 also manufactured and sold by Rohm & Haas Corporation.

The invention has been amply illustrated in the detailed discussion of the invention. These examples are given only to illustrate the invention and are not intended as limitations. The only limitations intended are found in the attached claims.

I claim:
1. A water emulsion concentrate consisting essentially of 35% to 60% by weight of finely divided 2,2-bis (p-chlorophenyl)-1,1,1-trichloroethane, 5% to 25% by weight of a highly aromatic oil having an aniline point of about 65-85° F. and boiling substantially continuously over the range about 33°-560° F., 1% to 5% by weight of a polyoxyethylene ether of t-octyl phenol having about 15-16 mols of ethylene oxide per mol of finished product, 1% to 5% by weight of a sodium salt of a polyoxyethylene ether sulfonate of t-octyl phenol having about 17-18 mols of ethylene oxide per mol of finished product and the balance water.

2. A water emulsion concentrate consisting essentially of 35% to 60% by weight of finely divided 2,2-bis (p-chlorophenyl)-1,1,1-trichloroethane, 15% by weight of a highly aromatic oil having an aniline point of about 65-85° F. and boiling substantially continuously over the range about 330-560° F., 3% by weight of a polyoxyethylene ether of t-octyl phenol having about 15-16 mols of ethylene oxide per mol of finished product, 3% by weight of a sodium salt of polyoxyethylene ether sulfonate of t-octyl phenol having about 17-18 mols of ethylene oxide per mol of finished product and the balance water.

3. The method of preparing a highly concentrated emulsion capable of being diluted for spray application by water which comprises mixing between about 35% to 60% by weight of finely divided 2,2-bis (p-chlorophenyl)-1,1,1-trichloroethane with 5-25% by weight of a highly aromatic oil having an aniline point of about 65-85° F. and boiling substantially continuously over the range about 330-560° F., separately mixing about 0.1% to 10% by weight of a polyoxyethylene ether of t-octyl phenol having about 15-16 mols of ethylene oxide per mol of finished product, 0.1% to 10% by weight of a sodium salt of polyoxyethylene ether sulfonate of t-octyl phenol having about 17-18 mols of ethylene oxide per mol of finished product with water to a balance of 100%, commingling the two mixtures in a Manton-Gaulin homogenizer at a temperature of 150-250° F. and passing the mixture through the homogenizer under pressure sufficient to provide a stable, uniform emulsion, capable of being diluted with additional water to provide a finished DDT emulsion spray.

References Cited in the file of this patent

UNITED STATES PATENTS

| 2,447,475 | Kaberg | Aug. 17, 1948 |
| 2,490,481 | Schulze | Dec. 6, 1949 |
| 2,519,088 | Walker | Aug. 15, 1950 |
| 2,521,318 | Wohlers | Sept. 5, 1950 |
| 2,614,061 | Coash | Oct. 14, 1952 |
| 2,696,453 | Sanders | Dec. 7, 1954 |
| 2,765,255 | Swarbrick | Oct. 2, 1956 |
| 2,768,111 | Butler | Oct. 23, 1956 |
| 2,872,368 | Sanders | Feb. 3, 1959 |
| 2,880,131 | Camp | Mar. 31, 1959 |
| 2,898,263 | Nelson | Aug. 4, 1959 |